Oct. 2, 1962 H. G. CONWAY ET AL 3,056,598
UNDER-CARRIAGE SHOCK ABSORBERS FOR AIRCRAFT
Filed April 15, 1959 5 Sheets-Sheet 3

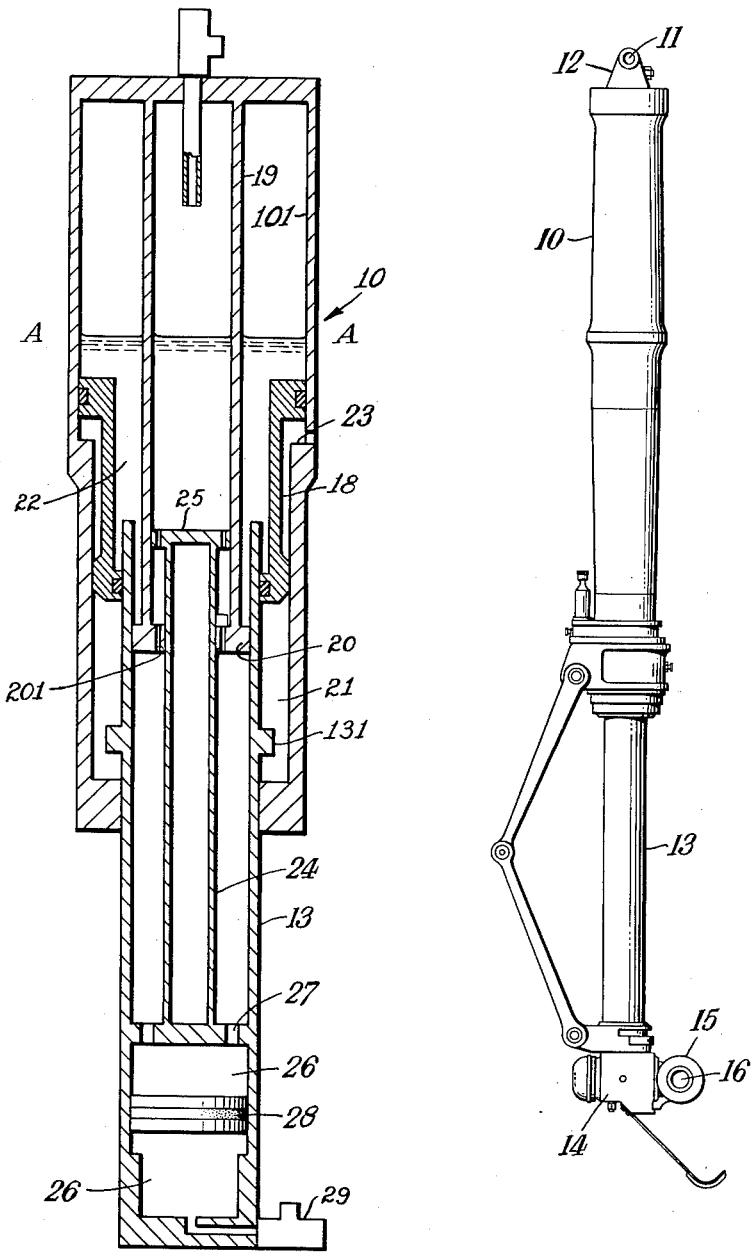

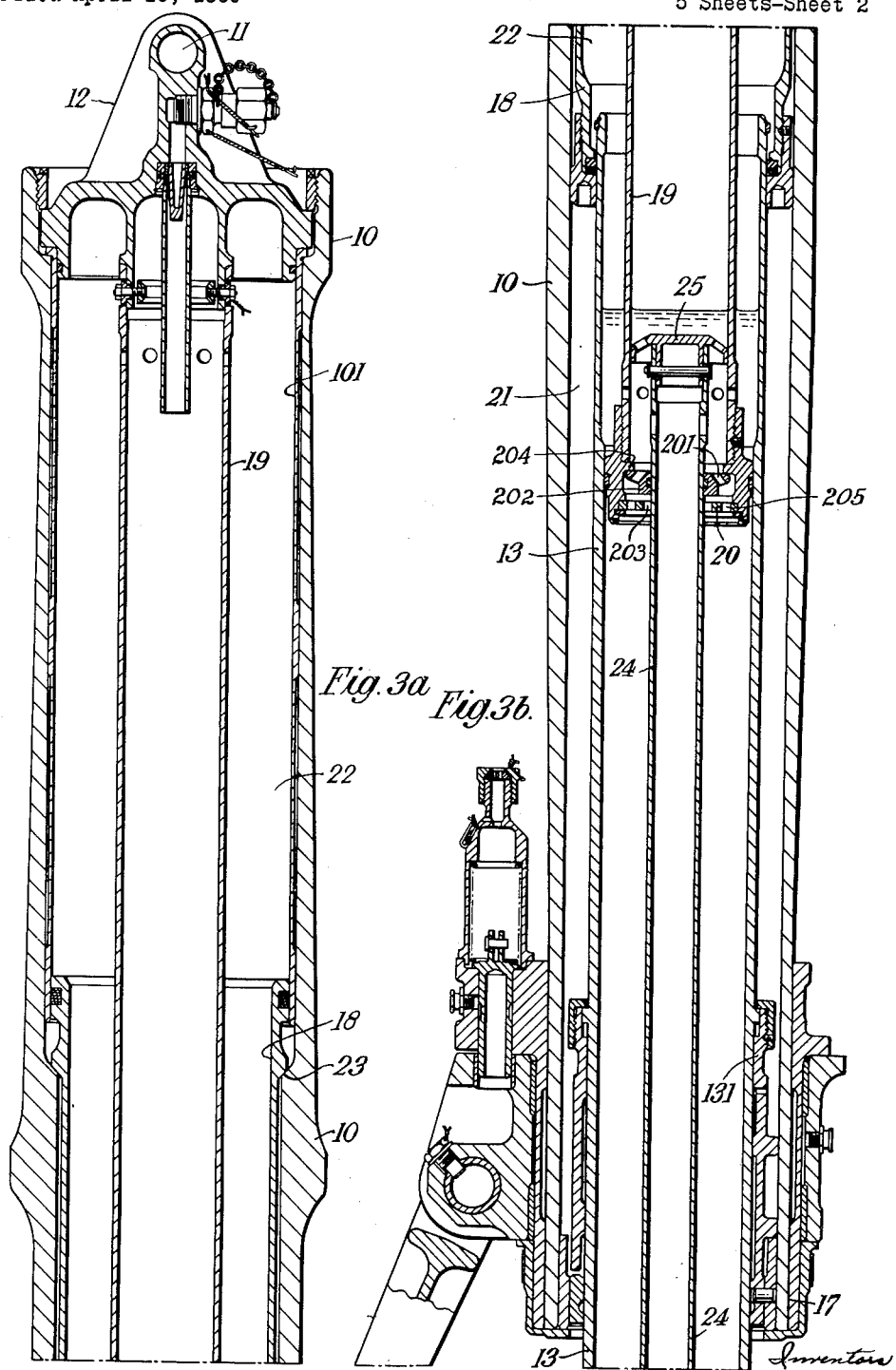

United States Patent Office 3,056,598
Patented Oct. 2, 1962

3,056,598
UNDER-CARRIAGE SHOCK ABSORBERS
FOR AIRCRAFT
Hugh Graham Conway, Crawfordsburn, and Richard Sutton Ransom, Holywood, Northern Ireland, assignors to Short Brothers & Harland Limited, Queens Island, Belfast, Northern Ireland
Filed Apr. 15, 1959, Ser. No. 806,562
Claims priority, application Great Britain Apr. 18, 1958
8 Claims. (Cl. 267—64)

The object of this invention is to provide an improved constructional arrangement of shock absorber for incorporation in the under-carriage of an aeroplane, in which a long travel must be provided for the telescopic leg to permit its use for vertical take-off and landing. An important requirement in such a case is that the extension load of the under-carriage should be kept to a minimum so that under vertical take-off conditions the nose and main under-carriage support reactions are small and consequently the stability of the aircraft depends almost entirely upon the flight control system even before the under-carriages are fully extended, and also that the under-carriages are immediately available to sustain the aircraft in the event of accident during take-off. It is also necessary that the shock absorber shall be capable of absorbing a wide range of landing shocks, having regard to the fact that vertical landing may occur at a velocity of 18 feet per second and a landing as a conventional aircraft at a velocity of only 12 feet per second.

According to this invention a shock absorber for the aforesaid purpose incorporates a dual-stage oleo-pneumatic compression unit, wherein the traverse of the moving element is resisted on the first stage of the compression stroke by a relatively slight compression of the air chamber volume, and on the second stage by an increased compression thereof due to the operation of a floating piston associated with said element. If desired, the shock absorber may include an additional air compression unit having a high inflation pressure and a low compression ratio, so as to reduce the high dynamic reaction of the shock absorber which may otherwise occur.

The application of the invention to the nose-wheel under-carriage of an aeroplane specifically designed for vertical take-off and landing in addition to take-off and landing in conventional manner, is illustrated in and hereinafter described with reference to the accompanying drawings.

FIG. 1 of said drawings is a section diagram depicting the principle of the invention, FIG. 2 is an elevation of the under-carriage shock-absorber, and FIGS. 3(a), 3(b), 3(c) and 3(d) are longitudinal sectional views of the shock-absorber, drawn on a larger scale.

Figure 3C:
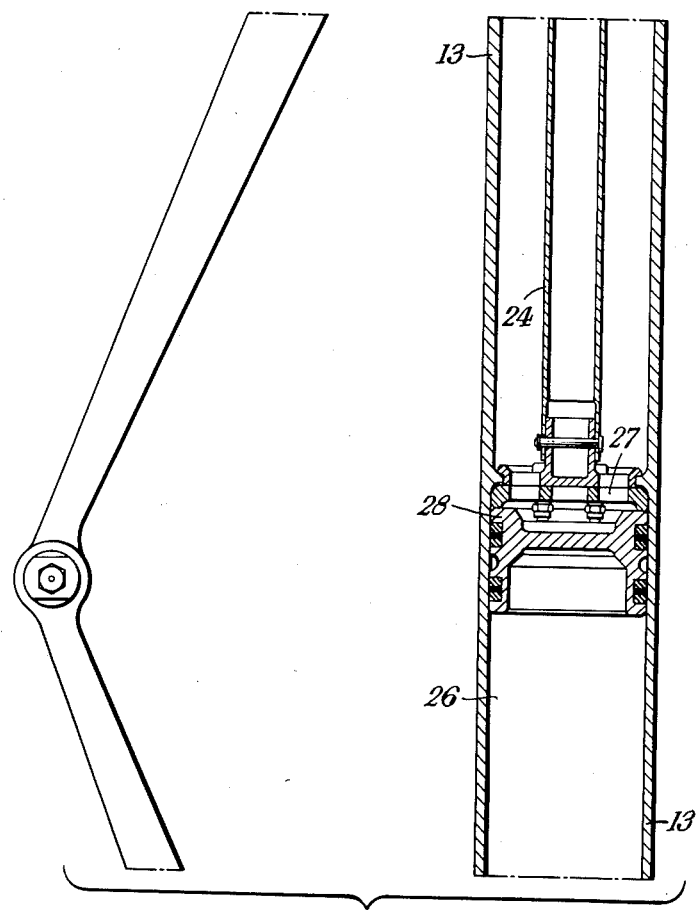
Figure 3D:
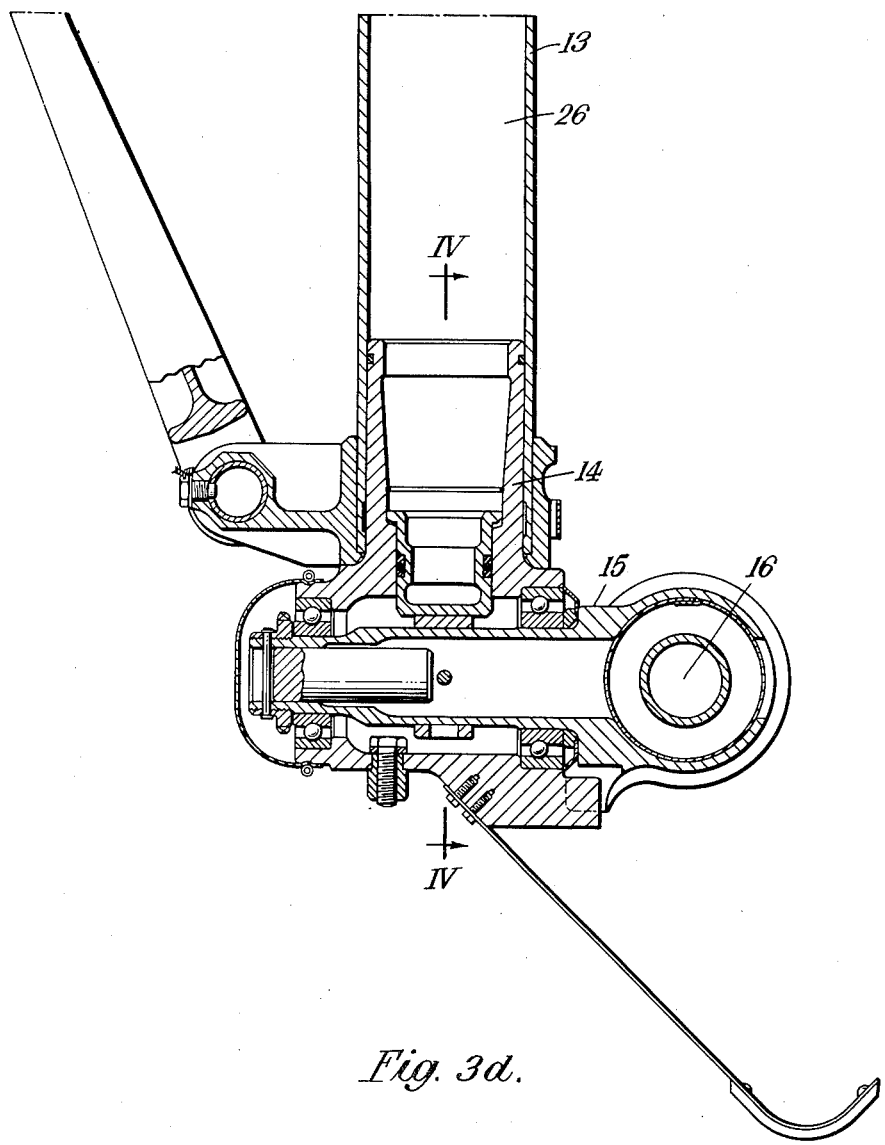
Figure 4:
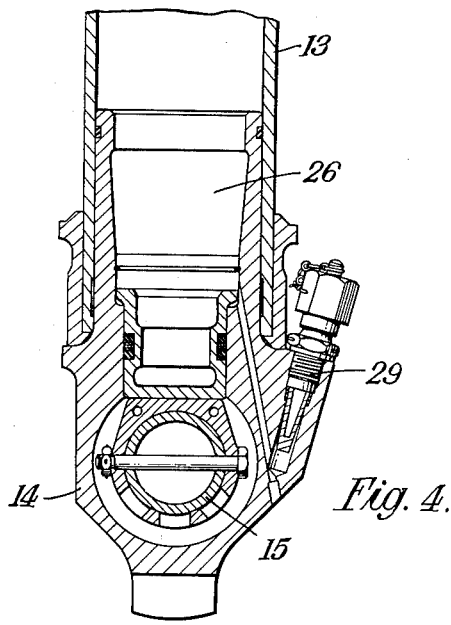
FIG. 4 is a fragmentary sectional view of the foot of the shock-absorber, taken in section on the line IV—IV of FIG. 3.

The shock-absorber comprises a cylindrical housing 10 which is connected to the airframe by a pivot 11 incorporated in the end bracket 12, and a sliding tube 13 which is an integral part of the extensible leg, in the foot of which is spigoted the bracket 14 carrying an offset 15 which is provided with a bearing 16 for the landing-wheel axle (not shown). The tube 13 is of less diameter than the housing 10 and arranged to slide axially therein through a bearing 17 in the lower end thereof.

The inner end of the sliding tube 13 is received in an annular floating piston 18 which has a limited degree of axial travel in the upper part 101 of the housing 10, and a collar 131, fixed on the exterior wall of the sliding tube 13 is arranged, when the tube has moved inwardly through a predetermined distance, to abut against the underside of said annular piston 18 so that the latter is carried upward throughout the remaining part of the inward stroke of the leg.

The sliding tube 13 receives in its inner open end a plunger tube 19 which is fixed to the end bracket 12 and which terminates in a piston 20 fitting the bore of the sliding tube 13. Orifices 201 are provided in said piston 20 to permit transfer of oil through the piston. The sliding tube-plunger assembly includes oil-containing chambers 21 and 22 respectively beneath and above the annular piston 18, as shown in FIG. 1. A substantial volume of air is contained in the upper part of the housing 10 and in the plunger tube 19 above the level of the oil indicated at A—A. A stop 23 is provided in the housing 10 for arresting the travel of the annular piston 18 at the appropriate point in the return stroke.

During the compression stroke, i.e. when the under-carriage first makes contact with the ground as the aircraft alights, oil inside the sliding tube is forced through the orifices 201 of the plunger tube piston 20, compressing the air in the upper chamber of the housing 10. After the under-carriage leg has travelled upwardly through the initial stage of its stroke the collar 131 on the sliding tube 13 reaches the annular piston 18 and carries the latter upwardly with it on the second stage. Whereas the compression on the initial stage takes place on the diameter of the upper end of the sliding tube 13, the displacement after the annular piston 18 has come into operation is due to the full diameter of the latter, i.e. the bore of the housing 10 itself.

Figure 5:
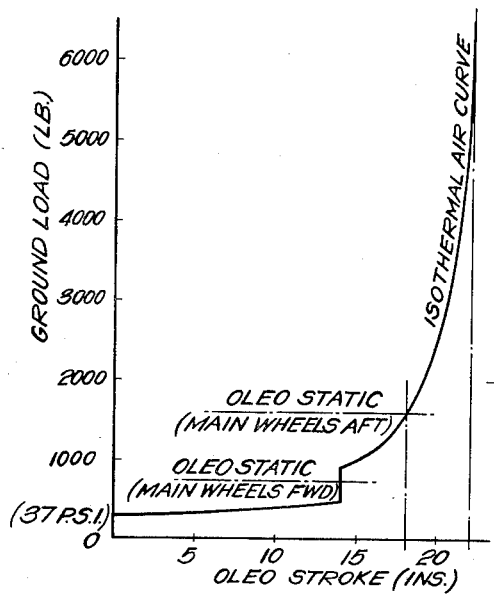
FIG. 5 is a graph of the compression curve characteristics of the shock-absorber.

There is thus only a slight compression of the air volume during the first stage, due to flow of oil from the tube 19 through the orifice 201 as before described, but a substantial compression during the second stage when the floating piston 18 moves. The relative diameters of the sliding tube 13 and the piston 20 are arranged so as to obtain the required two stage compression curve illustrated in the graph of FIG. 5.

As shown in FIG. 3(b), the piston 20 incorporates a flap valve 202, which is capable of limited sliding movement on the rod 24 between the underside of the head of the piston 20 and the abutment shoulder 204. During the compression stroke, said flap valve occupies the position shown in FIG. 3(b), in which it is in contact with said shoulder 204. On recoil of the leg, the flap valve lies flush against the piston 20. The flap valve 202 incorporates the aforesaid orifices 201, and in the recoil position an annular orifice 203 which exists between the rod 24 and the piston 20 is closed, retarding the flow of the oil through the orifices 205 and 201.

If desired, an addition central tube 24 of small diameter (known as a "variable orifice metering tube") may be arranged within the sliding tube 13, extending from the base thereof through a gland in the plunger tube piston 20 and terminating in an apertured subsidiary piston 25 fitting within the plunger tube 19. This arrangement may be used to enhance the oleo characteristics of the shock absorber, by providing an orifice area which varies as the stroke; for example, the holes in the wall of the tube 24 which are progressively passed by the piston 20 as the leg contracts, which specific combination is conventional in the art. The piston 25 is primarily intended to discourage emulsification of the oil in the upper air chamber after passing through the orifices 201.

In the illustrated embodiment of the invention, where the invention is particularly applied to a nose-wheel under-carriage, an additional chamber 26 is provided at the base of the sliding tube 13, access to said chamber for oil in the sliding tube being afforded by the orifices 27. Said chamber 26 contains a floating piston 28 which is supported on its underside by a cushion of air, contained in the lower part of the chamber 26. The pressure in said chamber 26 may be adjusted through the inflation valve 29. This device enables a reduction in the maximum dynamic reactions of the shock absorber on the first stage, by reason of the high pressure and low compression ratio of said air chamber 26. The overall efficiency of the shock absorber is also increased when the aircraft is landed at velocities exceeding those normally obtained in conventional aircraft landings.

What we claim as our invention and desire to secure by Letters Patent is:

1. A dual-stage oleo-pneumatic shock absorber for aircraft comprising: a cylindrical housing adapted at one end for connection to an airframe; a tubular member mounted for axial sliding motion in said housing and extending from the lower end thereof; external means on the outer end of said tubular member for mounting a landing wheel; a plunger tube fixed to the upper end of the housing and extending longitudinally therewithin; an apertured piston on said plunger tube disposed within the inner open end of said slideable tubular member; means for closing some of said apertures of said piston on the expansion or recoil stroke; an annular floating piston mounted for limited axial movement in the upper portion of said housing, the inner end of said slideable tubular member being received in said annular piston; a collar fixed to said slideable tubular member; said slideable tubular member moving inwardly upon the compression stroke of the shock absorber a predetermined distance, whereupon said collar abuts the underside of said annular piston to move it upwardly upon further compression.

2. The structure defined in claim 1 further including a variable orifice metering tube disposed within said tubular member and fixed thereto and extending coaxially from the base thereof through a gland in the plunger tube piston, the upper end of said variable orifice metering tube having an apertured piston thereon disposed within said plunger tube.

3. The structure defined in claim 1 in which said slideable tubular member is filled with oil; means defining a chamber at the outer end of said tubular member, a floating piston disposed within said chamber defining an air cushion supporting said oil.

4. The structure defined in claim 3 including means to vary the air pressure in said chamber.

5. A dual-stage oleo-pneumatic shock absorber for aircraft comprising: a cylindrical housing having external means at one end for connection to an airframe; a tubular member disposed in the other end of said housing and mounted for axial movement therein, a piston formed at the inner end of said tubular member; external means disposed on the outer end of said tubular member to mount a landing wheel; a floating annular piston slideably disposed in and entirely enclosed by said housing adjacent the inner end of said tubular member and adapted for axial movement relative to said housing and said tubular member, said floating piston having external and internal bearing surfaces arranged to cooperate respectively with the interior wall of the housing and an exterior surface of the tubular member, said floating piston being of larger effective area than the tubular member; means defining an air chamber between said one end of said housing and said floating piston and the piston at the inner end of said tubular member, whereby upon initial compression said tubular member moves axially to compress the air in said chamber over a small cross-sectional area and upon further compression said floating piston moves with said tubular member to compress the air in said chamber over a substantially larger cross-sectional area.

6. The structure defined in claim 5 in which said housing is filled with a damping fluid, a plunger tube in said housing; said plunger tube having a piston and flap valve at its inner end, said piston and flap valve being apertured to permit passage of said damping fluid therethrough; means for closing some of said apertures of said piston on the expansion or recoil stroke; means on the tubular member whereby the latter is caused to abut against the floating piston and thereby cause the floating piston and thereby cause the floating piston to move with the tubular member after an initial movement of the latter during compression.

7. The structure defined in claim 5 in which the length of stroke of said floating piston is less than the stroke of said tubular member.

8. The structure defined in claim 5 further including means defining an air compression unit at the outer end of said tubular member, said unit having a high inflation pressure and a low compression ratio to reduce the high dynamic reaction of the shock absorber in the initial stage of compression.

References Cited in the file of this patent

UNITED STATES PATENTS

| | | |
|---|---|---|
| 1,576,152 | Staats-oels | Mar. 9, 1926 |
| 1,819,414 | Gruss | Aug. 18, 1931 |
| 2,348,160 | Thornhill | May 2, 1944 |
| 2,451,171 | Mullen | Oct. 12, 1948 |
| 2,563,518 | Dickerman | Aug. 7, 1951 |
| 2,959,410 | Fullam et al. | Nov. 8, 1960 |